(12) United States Patent
Sakamoto et al.

(10) Patent No.: US 8,320,028 B2
(45) Date of Patent: Nov. 27, 2012

(54) OPTICAL SCANNING APPARATUS

(75) Inventors: Junshin Sakamoto, Ibaraki (JP); Takeshi Mochizuki, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 1442 days.

(21) Appl. No.: 11/892,279

(22) Filed: Aug. 21, 2007

(65) Prior Publication Data

US 2008/0068677 A1    Mar. 20, 2008

(30) Foreign Application Priority Data

Aug. 22, 2006 (JP) ............................... P2006-224808

(51) Int. Cl.
*H04N 1/04* (2006.01)

(52) U.S. Cl. .................. 358/480; 358/1.1; 358/1.15

(58) Field of Classification Search .................. 358/1.5, 358/480, 474
See application file for complete search history.

(56) References Cited

U.S. PATENT DOCUMENTS

| | | | |
|---|---|---|---|
| 4,617,578 A | 10/1986 | Nezu et al. | |
| 4,760,407 A | 7/1988 | Arimoto et al. | |
| 4,768,043 A | 8/1988 | Saito et al. | |
| 4,809,021 A | 2/1989 | Check et al. | |
| 4,841,137 A | 6/1989 | Mochizuki et al. | |
| 4,887,225 A * | 12/1989 | Yao ................. | 358/1.5 |
| 4,912,568 A | 3/1990 | Shimano | |
| 5,006,704 A | 4/1991 | Mochizuki et al. | |
| 2002/0054392 A1 * | 5/2002 | Tamaki et al. ............. | 358/514 |

FOREIGN PATENT DOCUMENTS

| | | |
|---|---|---|
| JP | 61-111070 (A) | 5/1986 |
| JP | 61-269563 A | 11/1986 |
| JP | 61-284992 A | 12/1986 |
| JP | 2-206566 | 8/1990 |
| JP | 3-249672 A | 11/1991 |
| JP | 6-160749 A | 6/1994 |
| JP | 9-159957 | 6/1997 |
| JP | 10-67137 A | 3/1998 |
| JP | 10-161047 | 6/1998 |
| JP | 10-217544 | 8/1998 |
| JP | 10-297016 A | 11/1998 |
| JP | 11-6971 A | 1/1999 |
| JP | 2001-212999 A | 8/2001 |
| JP | 2002-023087 A | 1/2002 |
| JP | 2002-072117 A | 3/2002 |
| JP | 2004-276446 A | 10/2004 |

OTHER PUBLICATIONS

Japanese Office Action dated May 31, 2012 with a partial English translation thereof.

* cited by examiner

*Primary Examiner* — King Poon
*Assistant Examiner* — Iriana Cruz
(74) *Attorney, Agent, or Firm* — McGinn IP Law Group, PLLC (57) ABSTRACT

According to an aspect of the present invention, there is provided an optical scanning apparatus including a light source, an optical unit, a first controller and a second controller. The light source emits a predetermined number of laser beams, the laser beams to be arranged in a sub-scanning direction on a recording medium. The optical unit simultaneously scans the laser beams in parallel on the recording medium. The first controller changes a dot size of the laser beams in a main scanning direction. The second controller changes the predetermined number.

16 Claims, 11 Drawing Sheets

OPTICAL SCANNING APPARATUS

CROSS-REFERENCE TO RELATED APPLICATIONS

The entire disclosure of Japanese Patent Application No. 2006-224808 filed on Aug. 22, 2006 including specification, claims, drawings and abstract is incorporated herein by reference in its entirety.

BACKGROUND OF THE INVENTION

1. Field of the Invention

An aspect of the present invention relates to an optical scanning apparatus in an electro-photographic type image forming device, and more particularly to an optical scanning apparatus that drives a plurality of laser beams at the same time.

2. Description of the Related Art

In the electro-photographic type image forming device such as a laser printer, it has been desired that two or more kinds of a print line width or a print dot density of an image can be selected in one image forming device.

In the image forming device of one beam scanning type, the rotating speed of a rotating polygon mirror is changed to change a dot space in a sub-scanning direction and a light intensity modulating clock frequency of a light source is changed to change a dot space in a scanning direction so that the print dot density can be changed.

However, in recent years, a high speed and high density rapidly progress and a multi-beam scanning system is used that a plurality of optical beams are driven at the same time during one scanning operation. As the light source, since a semiconductor laser array or a two-dimensional face light emitting laser is used, the print dot density can not be changed in the usual system. In the multi-beam scanning system, since a plurality of semiconductor laser elements are obliquely arranged or arranged lengthwise to scan a photo-sensitive member, the space of the optical beams in the sub-scanning direction is set to a fixed value in accordance with the arrangement of the semiconductor laser elements. Accordingly, even when the rotating speed of the rotating polygon mirror is changed as described above, since the space between the beams outputted from the light source in the sub-scanning direction is fixed during the one scanning operation, a print density can not be changed.

JP-A-9-159957 discloses an optical scanning apparatus having a light source composed of a semiconductor laser, a collimator lens that collimates light from the light source and a cylinder lens that guides the light from the collimator lens to a rotating polygon mirror, wherein two lenses that can be freely taken in and out from an optical path are provided between the collimator lens and the cylinder lens.

JP-A-10-217544 and JP-A-10-161047 disclose that a light source is mechanically rotated to change an inclination so that a space between a plurality of beams in a sub-scanning direction is changed on a photo-sensitive member. In these systems, when a dot density is changed, the rotating speed of a rotating polygon mirror is also changed.

JP-A-2-206566 discloses a device in which the rotating speed of a spindle motor 12 (for a rotating polygon mirror) is varied to change a resolution, however, since a switching time is necessary due to an inertia, when the least common multiple of N kinds of resolutions, for instance, the resolutions of 240 dpi, 360 dpi, 480 dpi and 960 dpi is required, the spindle motor is rotated at such a rotating speed as to obtain the resolution of 2880 dpi as the least common multiple thereof and the resolution is switched by a resolution switching signal determined by a print magnification supplied from a host device, and a print start signal (BD) is switched to a signal obtained by dividing a frequency at an integer ratio in accordance with the resolution to repeat an exposure in that cycle.

In JP-A-9-159957, JP-A-10-217544 and JP-A-10-161047, since a mechanism for taking in and out the lens to the optical path or a mechanism for rotating the light source are necessary, a problem arises that the structure of the optical scanning apparatus is complicated. Further, a mechanical accuracy is required for adjusting a beam pitch at intervals of several μm, so that a problem also arises that the optical scanning apparatus is expensive.

Further, when the dot density is changed, the rotating speed of the rotating polygon mirror is also changed. For instance, when the dot density is decreased to half of the dot density, the rotating speed of the rotating polygon mirror also needs to be half of the rotating speed. It takes several ten seconds to several minutes to change the dot density. Therefore, for instance, change of the dot density can not be finished between pages (in several ten ms to several hundred ms) In JP-A-2-206566, a necessary dot density can be easily realized without changing the rotating speed of the polygon mirror. However, in this system, since a beam is detected and the frequency is divided to switch the resolution, a beam space for scanning the BD is extremely narrow to make it difficult to separate adjacent beams and generate the BD signal corresponding to the dot density in a plurality of beam scanning operation using a laser array light source with a plurality of laser elements arranged at intervals of narrow pitches.

SUMMARY OF THE INVENTION

According to an aspect of the present invention, there is provided an optical scanning apparatus including: a light source that emits a predetermined number of laser beams, the laser beams to be arranged in a sub-scanning direction on a recording medium; an optical unit that simultaneously scans the laser beams in parallel on the recording medium; a first controller that changes a dot size of the laser beams in a main scanning direction; and a second controller that changes the predetermined number.

According to another aspect of the present invention, there is provided an optical scanning apparatus including: means for emitting a predetermined number of laser beams, the laser beams to be arranged in a sub-scanning direction on a recording medium; means for simultaneously scanning the laser beams in parallel on the recording medium; means for changing a dot size of the laser beams in a main scanning direction; and means for changing the predetermined number.

BRIEF DESCRIPTION OF THE DRAWINGS

Embodiments of the present invention will be described in detail based on the following figures, wherein.

DETAILED DESCRIPTION OF THE INVENTION

One embodiment of an optical scanning apparatus according to the present invention will be described by referring to the drawings.

Figure 1:
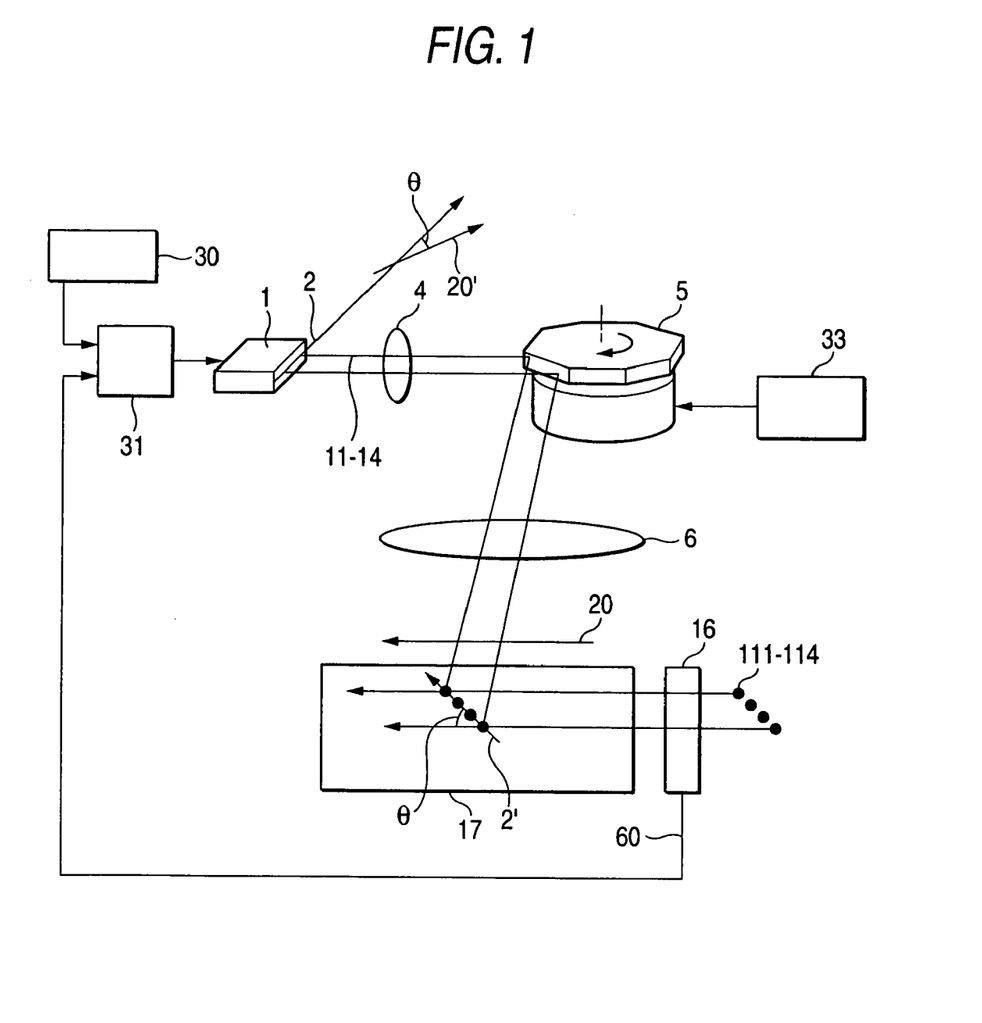
FIG. 1 is a schematic view showing on example of a structure of an optical scanning apparatus according to an aspect of the present invention.

FIG. 1 schematically shows the structure of the optical scanning apparatus. In FIG. 1, a light source 1 is composed of a laser array in which a plurality of semiconductor laser elements are incorporated. The lights of the plurality of semiconductor laser elements are respectively and independently modulated. In FIG. 1, the light source 1 has the four semiconductor laser elements is exemplary shown. The plurality of laser light emitting elements are arranged at equal intervals on a straight line in a prescribed direction shown by 2. Light beams 11, 12, 13 and 14 respectively emitted from the semiconductor laser elements of the light source 1 are applied to a rotating polygon mirror 5 through a first optical system 4 such as a collimator lens. The rotating polygon mirror 5 is driven and controlled by a rotating polygon mirror driving part 33. The light beams deflected and driven by the rotating polygon mirror 5 form images on the surface of a recording medium 17 such as a photo-sensitive member through a scanning lens 6 such as an Fθ lens and light beams 111, 112, 113 and 114 having a uniform spot diameter are formed.

Figure 2A:
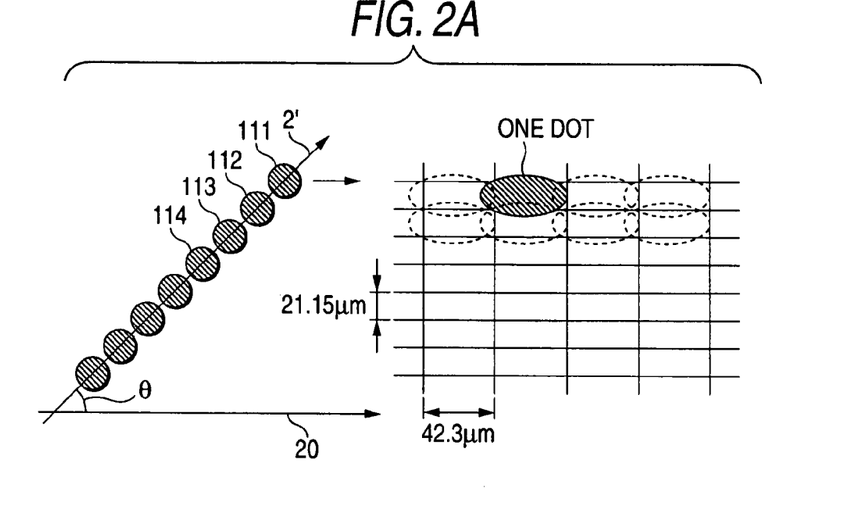
FIG. 2A is an exemplary view showing one example of an arrangement of dots in a main scanning direction and a sub-scanning direction in the optical scanning apparatus.
Figure 2B:
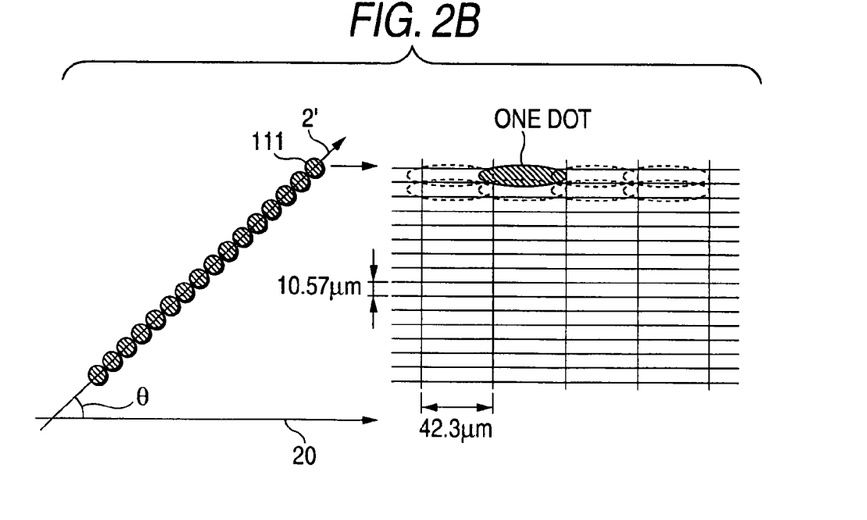
FIG. 2B is an explanatory view showing one example of an arrangement of dots in the main scanning direction and the sub-scanning direction in the optical scanning apparatus.

FIGS. 2A and 2B shows an example of the arrangement of dots formed by the light beams 111 to 114 on the surface of the recording medium 17. On the light source 1, the semiconductor laser elements are arranged in the arranging direction 2 as shown in FIG. 1. The arranging direction 2 is inclined by a predetermined angle θ relative to the imaginary scanning direction 20' that corresponds to the scanning direction 20 (FIG. 1) of the beams on the recording medium 17. On the recording medium 17, light spots formed by the light beams 111 to 114 are formed along the imaginary arranging direction 2' that corresponds to the arranging direction 2. The imaginary arranging direction 2' is also inclined by the predetermined angle θ relative to the scanning direction 20. These light beams 111 to 114 are arranged diagonally at equal intervals in a sub-scanning direction of the recording medium 17 and driven in parallel at the same time.

FIG. 2A shows an example of arrangement of the dots capable of writing data in which a dot space (dot length) in a main scanning direction is set to 42.3 μm and a space of scanning beams in the sub-scanning direction is set to 21.15 μm 1/2 times of the dot space in the main scanning direction. FIG. 2B shows an another example of arrangement of the dots capable of writing data in which a dot space (dot length) in a main scanning direction is set to 42.3 μm and a space of scanning beams in the sub-scanning direction is set to 10.57 μm 1/4 times of the dot space in the main scanning direction. In both the examples, the dot space (dot length) in the main scanning direction is set to 42.3 μm, however, the present invention is not limited to this value and an arbitrary value can be selected. In this embodiment, the space of the scanning beams in the sub-scanning direction is selected to the number of 1/integer times of the dot space (the dot length) in the main scanning direction.

Returning to the explanation of FIG. 1, in the vicinity of an end part of the scanning surface of the recording medium 17, a photo-detector 16 is disposed. Based on a detected result of the photo-detector 16, a scanning start time of each light beam is determined. A detecting signal 60 from the photo-detector 16 is supplied to a laser driving circuit part 31.

Image information showing the image formed on the recording medium 17 is supplied to a control part 30 from a computer not shown in the drawing and applied to the laser driving circuit part 31 from the control part 30. The laser driving circuit part 31 controls respectively the semiconductor laser elements of the light source 1 synchronously with the detecting signal 60 to modulate the intensity of the lights of the light beams 111 to 114 respectively outputted from the semiconductor laser elements in accordance with the image information from the control part 30.

An embodiment capable of switching a print dot density will be described below.

(First Embodiment)

Figure 3A:
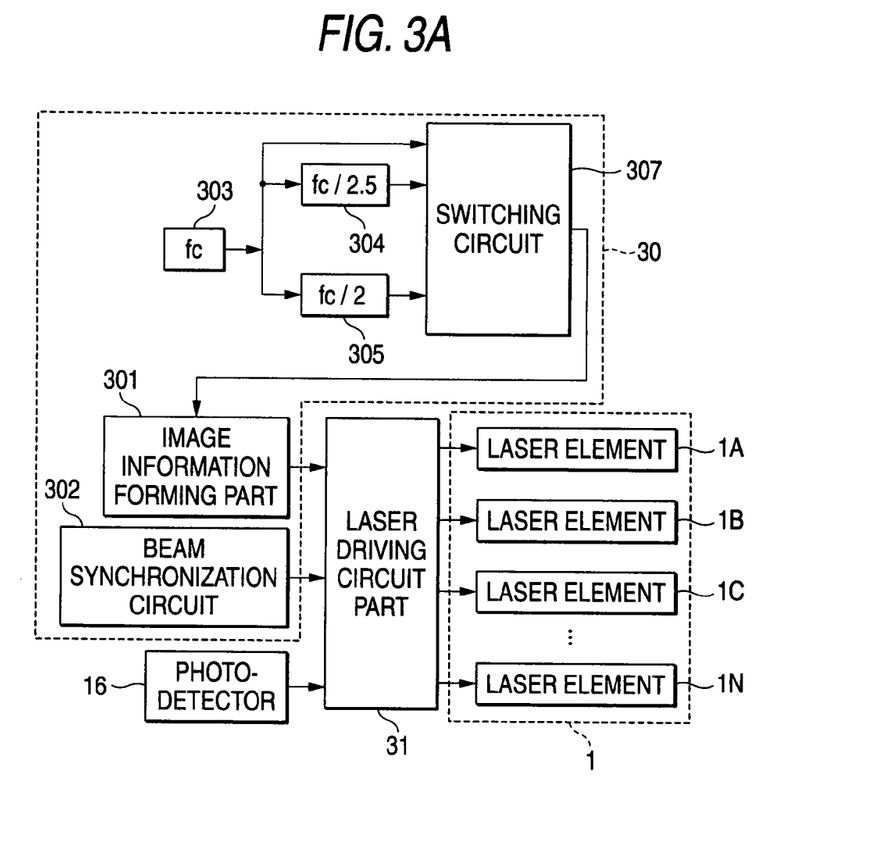
FIG. 3A is a block diagram showing one example of a control part in the optical scanning apparatus.

FIG. 3A is a block diagram showing one embodiment of the control part in the optical scanning apparatus in which the print dot density is switched to either of 240 dpi and 300 dpi. In the drawing, reference numeral 303 designates a clock signal generator that generates a dot clock of a frequency fc. 304 designates a frequency dividing circuit that reduces the dot clock frequency from fc to fc/2.5. 305 designates a frequency dividing circuit that reduces the dot clock frequency from fc to fc/2. This dot clock signal is used to modulate an image information signal and has a modulating time 2.5 times of the modulating time of the frequency fc when the dot clock frequency is reduced from fc to fc/2.5, and 2 times of the modulating time of the frequency fc when the dot clock frequency is reduced from fc to fc/2.

Figure 3B:
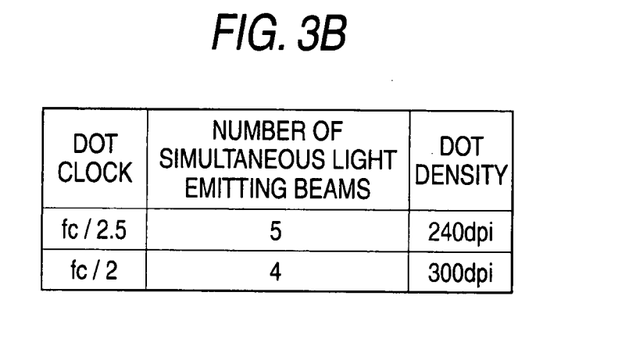
FIG. 3B is an explanatory view showing one example of print densities of the optical scanning apparatus.

307 designates a switching circuit to select and output one of the dot clock signals of the frequency dividing circuits 304 and 305. As shown in FIG. 3B, when the print dot density is 240 dpi, the dot clock frequency of fc/2.5 is selected. When the print dot density is 300 dpi, the dot clock frequency of fc/2 is selected. An output signal of the switching circuit 307 is applied to an image information forming part 301.

On the other hand, the image information showing a print image is applied to the laser driving circuit 31 from the image information forming part 301. 302 designates a beam synchronization circuit to determine the number of beams that emit lights at the same time in the laser elements 1A to 1N of the light source 1. A signal from the beam synchronization circuit 302 is also applied to the laser driving circuit 31. In this embodiment, as shown 3B, an example is shown that when the print dot density is 240 dpi, the 5 adjacent laser elements are controlled to emit lights at the same time, and when the print dot density is 300 dpi, the 4 laser elements are controlled to emit lights at the same time.

The laser driving circuit part 31 modulates the light beams outputted from the laser elements 1A to 1N by the selected dot clock frequency in accordance with the signal from the image information forming part 301.

In this embodiment, the number N of the semiconductor laser elements 1A to 1N of the light source 1 is desirably 20 as the least common multiple of the number of 4 and 5 of the simultaneous light emitting beams shown in FIG. 3B. That is, when the number of the semiconductor laser elements is equal to the least common multiple of the number of the simultaneous light emitting beams, even if the print dot density is switched from 240 dpi to 300 dpi, the combination of the simultaneously light emitting semiconductor elements does not need to be changed. Since a circuit that changes the combination of the simultaneous light emitting beams based on the change of the print dot density, a circuit structure is simplified.

An operation of the embodiment will be described by referring to FIGS. 4A and 4B. In this embodiment, the dot space (dot length) in the main scanning direction by the clock frequency fc is set to 42.3 μm and the space of the scanning beams in the sub-scanning direction is set to 21.15 μm 1/2 times of the dot space in the main scanning direction.

When the print dot density is 240 dpi, the clock frequency of fc/2.5 is selected by the switching circuit 307. Since the modulating time of the dot clock is increased to 2.5 times of that of the frequency fc, the length of one dot is increased in the main scanning direction as shown in FIG. 4A and is 105.8 μm 2.5 times of 42.3 μm.

Figure 4A:
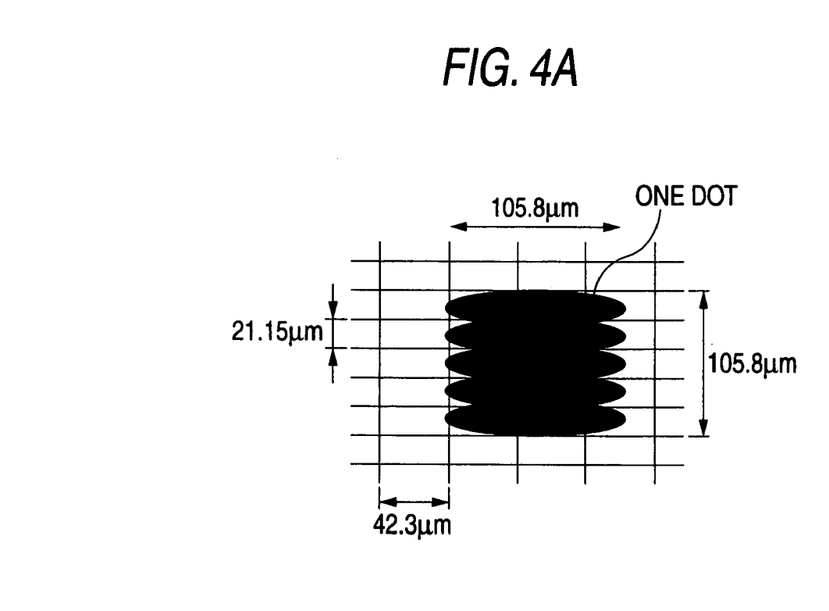
FIG. 4A is an explanatory view of one example of an operation in the optical scanning apparatus.

On the other hand, since the number of the laser elements emitting the lights at the same time is determined to 5 by the beam synchronization circuit 302, as shown in FIG. 4A, the 5 laser elements in the sub-scanning direction emit lights at the same time. Accordingly, one dot is 105.8 μm×105.8 μm and the print dot density is 240 dpi.

Further, when the print dot density is 300 dpi, the clock frequency of fc/2 is selected by the switching circuit 307. Accordingly, since the modulating time of the dot clock is increased to 2 times of that of the frequency fc, the length of the one dot in the main scanning direction is 84.7 μm 2 times of 42.3 μm as shown in FIG. 4B.

Figure 4B:
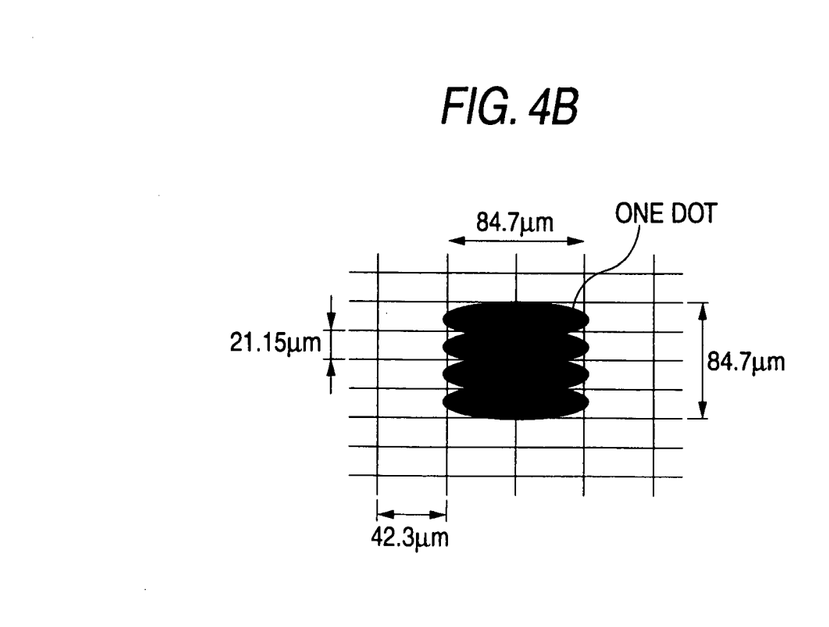
FIG. 4B is an explanatory view of another example of an operation in the optical scanning apparatus.

On the other hand, since the number of the laser elements emitting the lights at the same time is determined to 4 by the beam synchronization circuit 302, as shown in FIG. 4B, the 4 laser elements in the sub-scanning direction emit lights at the same time. Accordingly, one dot is 84.7 μm×84.7 μm and the print dot density is 300 dpi.

As described above, the print dot density can be switched under the control of an electronic circuit without adding a complicated mechanism.

(Second Embodiment)

Figure 5A:
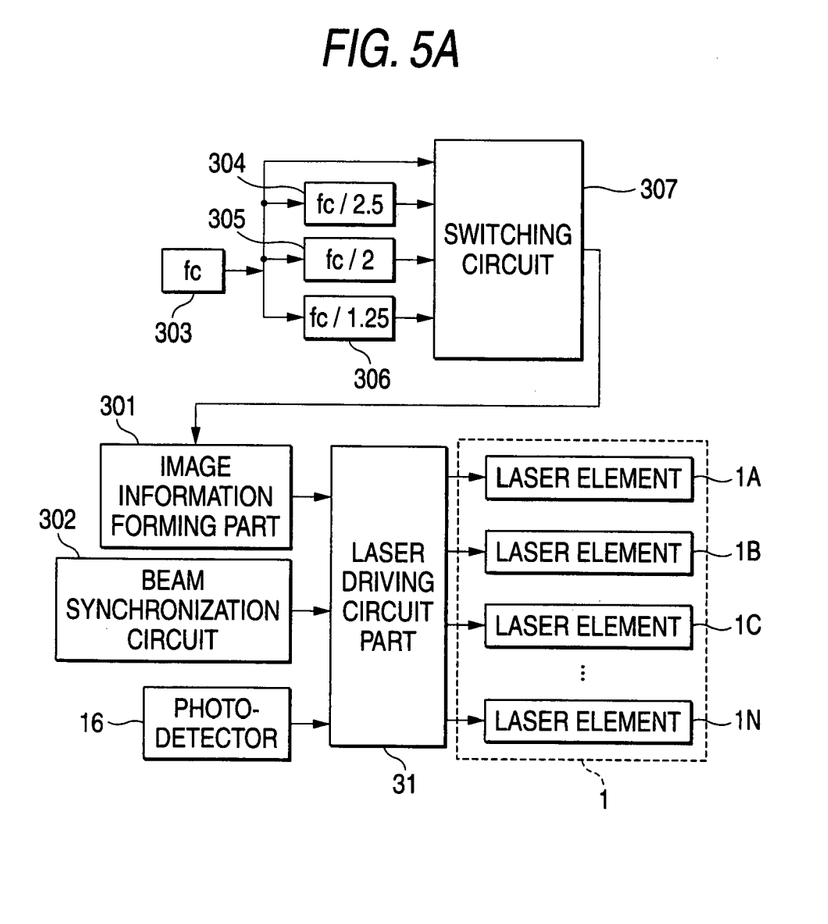
FIG. 5A a block diagram showing another example of a control part in the optical scanning apparatus.

FIG. 5A is a block diagram showing another embodiment of a control part in an optical scanning apparatus according to the present invention and shows an example that a print dot density can be switched to three kinds of 240 dpi, 300 dpi and 480 dpi.

In FIG. 5A, the same components as those of FIG. 3A are designated by the same reference numerals and signs to avoid a duplicated explanation. In this embodiment, a frequency dividing circuit 306 for generating a clock of a frequency of fc/1.25 is provided in addition to frequency dividing circuits of frequencies of fc/2.5 and fc/2 of a dot clock frequency fc. A beam synchronization circuit 302 switches, as shown in FIG. 5A, the number of light beams emitting lights at the same time to 10, when the print dot density is 240 dpi, 8 when the print dot density is 300 dpi and 4 when the print dot density is 480 dpi. The number N of laser elements 1A to 1N is desirably set to 40 as the least common multiple of 10, 8 and 5.

Figure 6A:
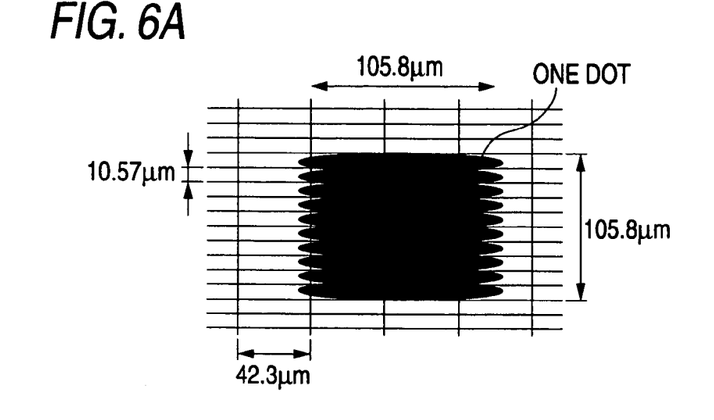
FIG. 6A is an explanatory view of still another example of an operation in the optical scanning apparatus.
Figure 6B:
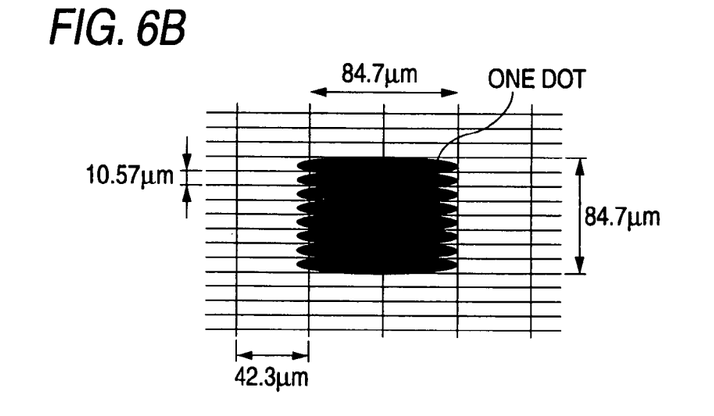
FIG. 6B is an explanatory view of still another example of an operation in the optical scanning apparatus.
Figure 6C:
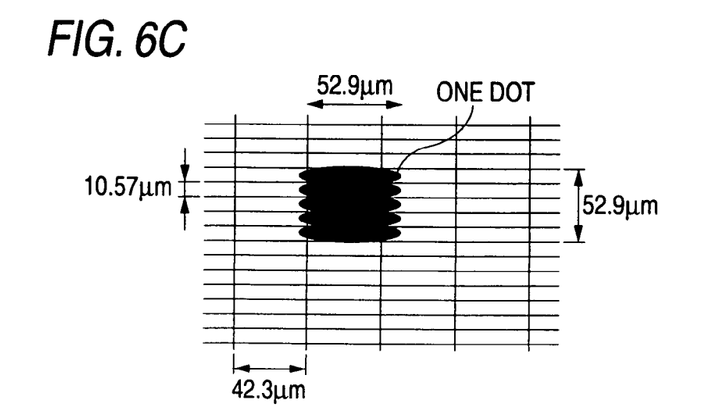
FIG. 6C is an explanatory view of still another example of an operation in the optical scanning apparatus.

An operation of this embodiment will be described by referring to FIGS. 6A to 6C.

In this embodiment, the length of one dot in a main scanning direction at the time of clock fc is set to 42.3 μm and a space of adjacent scanning lines in a sub-scanning direction is set to 10.57 μm.

Figure 5B:
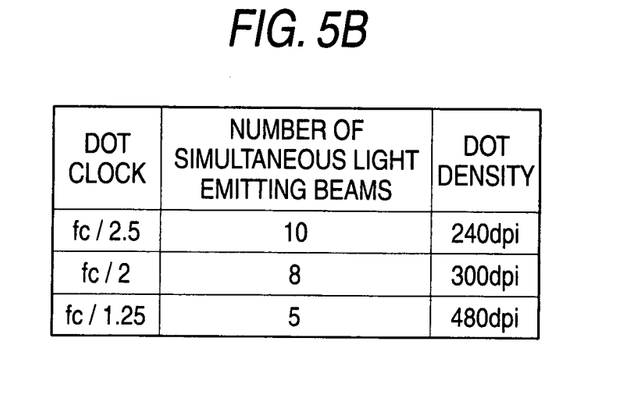
FIG. 5B is an explanatory view showing another example of print densities of the optical scanning apparatus.

When the print dot density is 240 dpi, since the dot clock frequency is fc/2.5 as shown in FIG. 5B, a modulating time becomes 2.5 times of that of the dot clock frequency fc and the length of the one dot in the main scanning direction is 42.3 μm×2.5=105.8 μm. At this time, since 10 laser elements emit simultaneously lights, the length of the one dot in the sub-scanning direction has a size of 10.57 μm×10=105.8 μm. Similarly, when the print dot density is 300 dpi, as shown in FIG. 6B, one dot is 84.7 μm×84.7 μm. When the print dot density is 480 dpi, one dot is 52.9 μm×52.9 μm.

Figure 7:
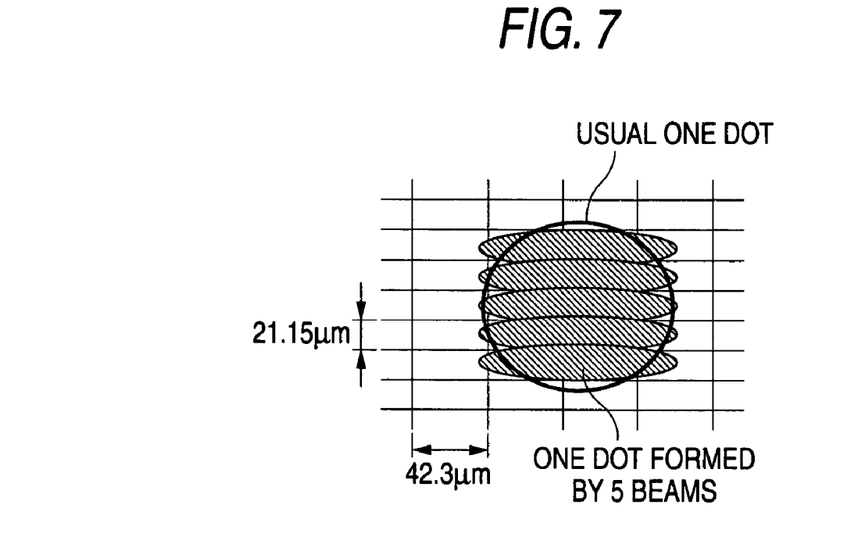
FIG. 7 is an explanatory view exemplary showing that a dot form obtained when a dot density is changed is compared with a usual dot form.

As described above, since the print dot density is switched by suitably selecting the dot clock frequency and the number of the simultaneous light emitting beams, the form of the one dot is not a perfect circle as shown in FIG. 7. Since the form of the one dot is similar to a square, an exposed area is increased more than that of the circular dot form. Thus, preferably, a quantity of exposure on a recording medium is decreased to set the diameter or the line width of the one dot to be equal to the usual value thereof by suitably adjusting the intensity of light of a light source based on the print dot density. To suppress the intensity of light to a value lower than that of the circular dot form, the output light of the light source may be reduced or a modulating width (dot length) of the one dot may be narrowed.

Figure 8:
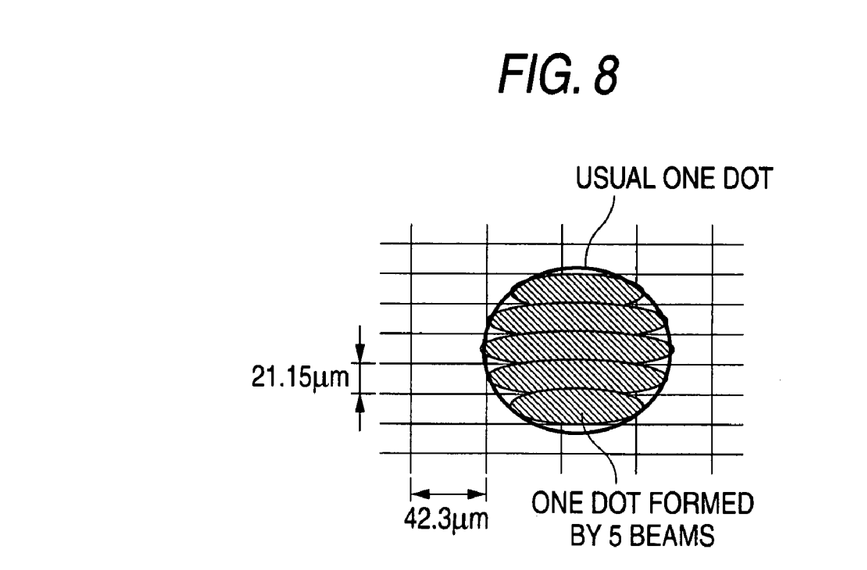
FIG. 8 is an explanatory view exemplary showing the form of one dot when a quantity of exposure is changed for each scanning beam.

As shown in FIG. 8, it is also preferable that change the clock pulse width of the dot clock of the semiconductor laser elements respectively for each beam in the plurality of simultaneous light emitting beams, or change the levels of the outputs of the lights of the semiconductor laser elements respectively, so that the form of the dot can be made to be nearer to the usual form of the one dot.

(Detecting Method of Light Beam)

In FIG. 1, it is shown that the light source 1 has the four laser light emitting elements. However, considerable number of the simultaneous light emitting beams may be required.

Figure 9:
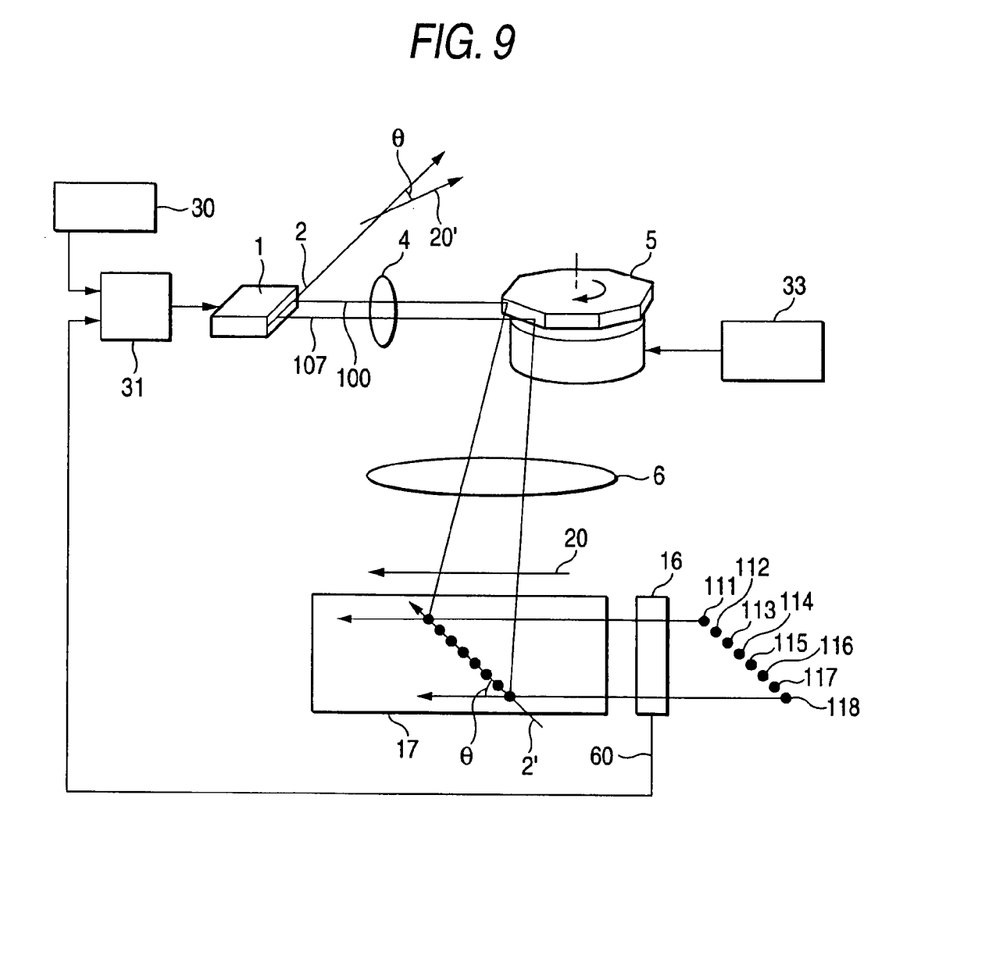
FIG. 9 is a schematic view showing another example of an optical scanning apparatus.

FIG. 9 shows an example that 8 semiconductor laser elements which can respectively independently modulate light are incorporated in a light source 1. In this case, light beams 111 to 118 are formed on the surface of the recording medium 17 as a scanning surface as shown in FIG. 9 and the 8 light beams are driven at equal intervals in parallel and at the same time. In the vicinity of an end part of the scanning surface 17, a photo-detector 16 is disposed for determining positions of the beginning to write on the recording medium 17 by the beams respectively. A method for detecting the light beams by the photo-detector 16 will be described below.

Figure 10:
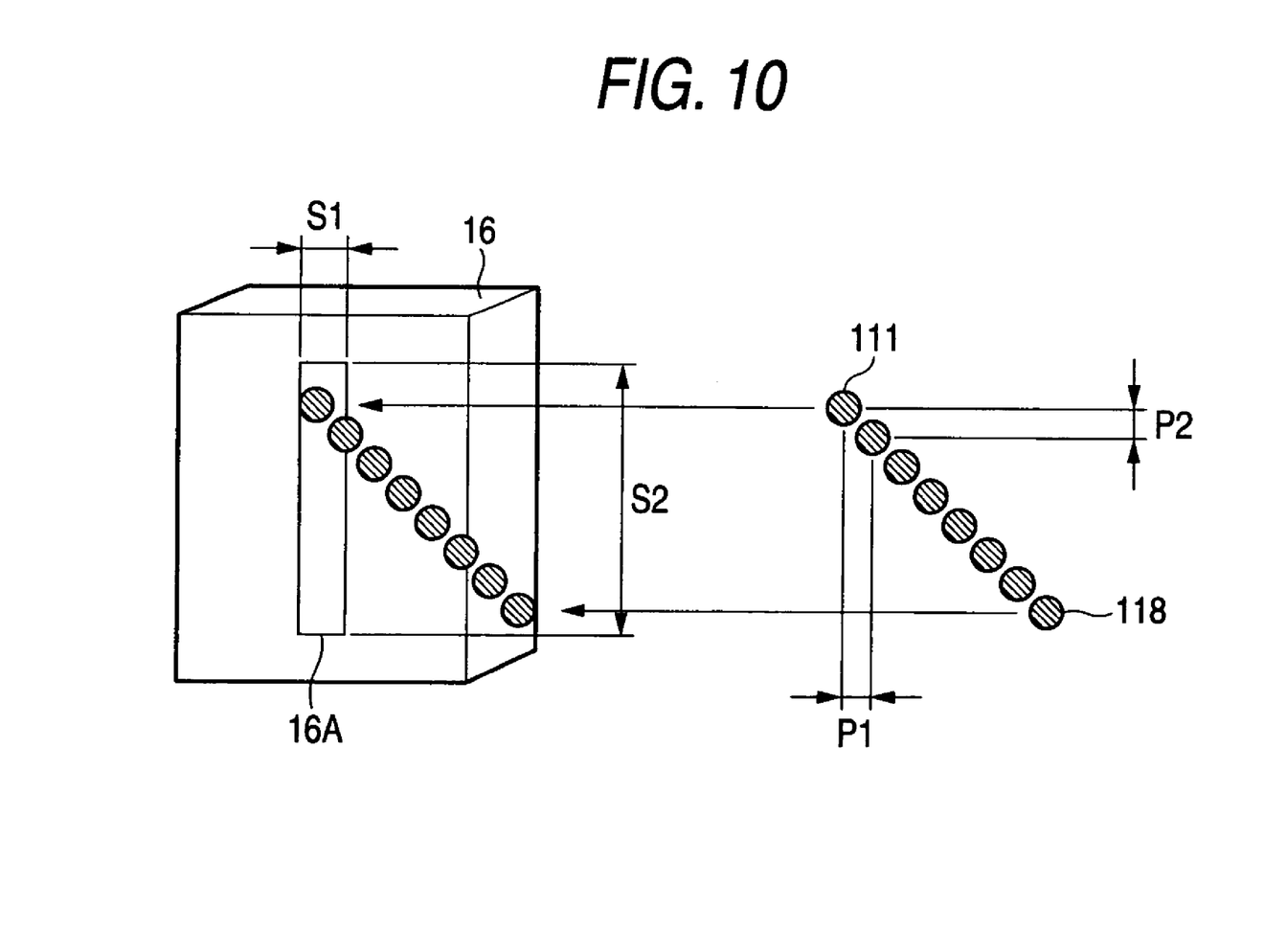
FIG. 10 is an explanatory view of detection of scanning beams in the optical scanning apparatus.

The photo-detector 16 shown in FIG. 10 has a rectangular detector part 16A having breadth S1 and length S2. Converging beams 111 to 118 are accommodated within the length of length S2 to scan the surface of a sheet in a horizontal direction.

Since a lengthwise pitch P2 between the converging beams is substantially equal to a pitch of a maximum print density to print an image, for instance, when a print density is 1200 dpi, the pitch P2 is 21.2 µm. Consequently, when the 8 beams are driven in parallel at the same time, the length dimension S2 of the detector part 16A may ensure a dimension of (21.2 µm×7+ the diameter of the scanning beam) or more.

A pitch P1 of the converging beams 111 to 118 in a main scanning direction is determined by an interval of the arrangement of the semiconductor laser elements and the magnification of an optical system of the light source 1. As a high recording speed and a high density progress, since the number of the semiconductor laser elements is apt to increase, the pitch between the elements is liable to be narrow. If the breadth dimension S1 of the detector part 16A is set to about 0.5 mm and the interval of the arrangement of the semiconductor laser elements of the light source 1 is 40 µm or less, the pitch P1 of the converging beams might be smaller than the breadth dimension S1 (0.5 mm).

Figure 11A:
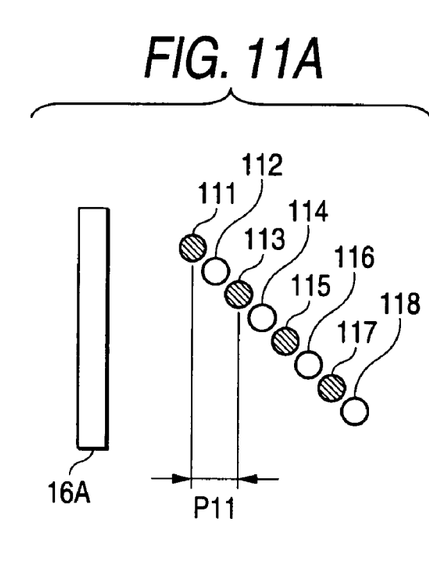
FIG. 11A is an explanatory view for explaining a method for detecting scanning beams in the optical scanning apparatus.
Figure 11B:
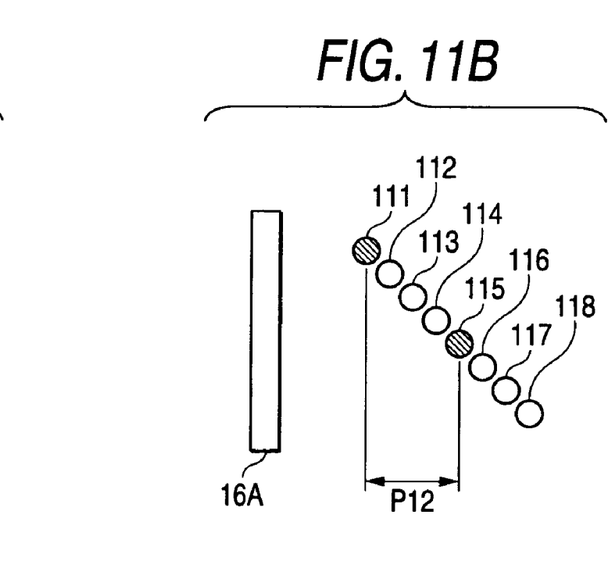
FIG. 11B is an explanatory view for explaining a method for detecting scanning beams in the optical scanning apparatus.

Thus, it is preferable to apparently widen the pitch P1 by selectively emitting the beams 111 to 118 for detecting and separating the converging beams by the detector part 16A. In this embodiment, as shown in FIGS. 11A and 11B, the beams 111 to 118 are selectively emitted and the pitch P1 is apparently widened. The beam painted out in black in the drawing shows a beam that is allowed to emit light when it passes the detector part 16A and the white beam shows a beam that is not allowed to emit light when it passes the detector part 16A.

FIG. 11A shows an example that only the scanning beams 111, 113, 115 and 117 are allowed to emit the lights when the scanning beams pass the detector part 16A. FIG. 11B shows an example that only the beams 111 and 115 of the scanning beams 111 to 118 are allowed to emit the lights. As described above, an apparent pitch P11 when the four scanning beams of the 8 scanning beans are allowed to emit the lights is two times of P1. An apparent pitch P12 when the two beams are allowed to emit the lights is 4 times of P1.

Figure 12A:
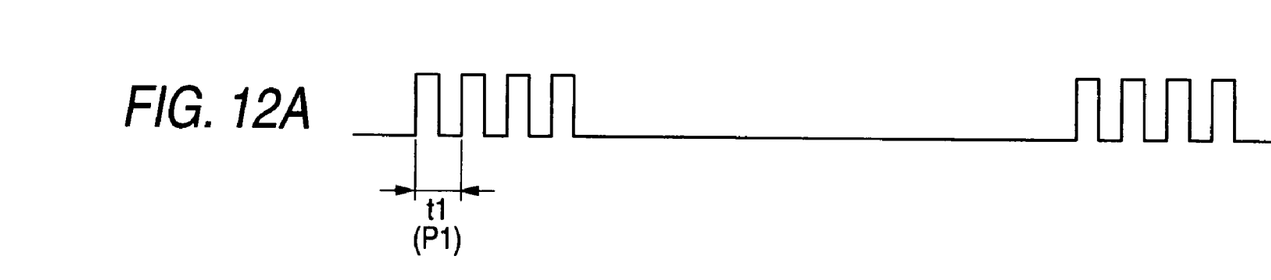
FIG. 12A is a timing chart for explaining an operation of a circuit part of the optical scanning apparatus.

The beam painted out in black indicates a light emitting beam. A detected signal obtains such a wave form (a detecting signal 60) as shown in FIG. 12A and serves as a signal for determining the beginning to write in a scanning direction. Namely, the intensity of the lights of the plurality of beams 111, 113, 115 and 117 is modulated by a signal showing image information from a control system 30 through a laser driving circuit part 31 synchronously with the detecting signal 60. The converging beams 112, 114, 116 and 118 measure a time t1 shown in FIG. 12A by a clock counter and set a time that the beams 112, 114, 116 and 118 respectively delay by t1/2 from the detected beams 111, 113, 115 and 117 so that the beginning to write the beam in the scanning direction can be determined. Since P1 is changed due to the influence of the deviation of a laser wavelength caused by temperature, the time t1 is measured so that the positional variation of the converging beams 111 to 118 can be respectively corrected.

Figure 12B:
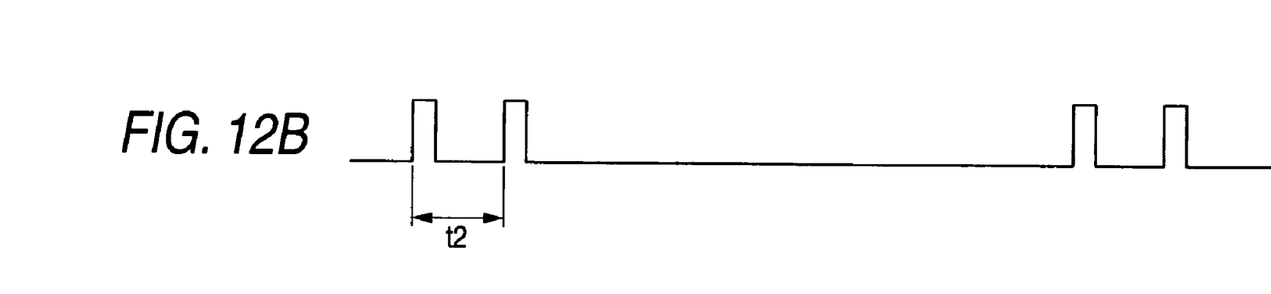
FIG. 12B is a timing chart for explaining an operation of a circuit part of the optical scanning apparatus.

As described above, when the dot density is changed, N as the common multiple of the numbers N1 and N2 of beams that emit lights at the same time for each dot density is allowed to be equal to the number of the beams of the light source, the combinations of the beams emitting lights at the same time in a certain dot density can be made to be equal. Namely, when the beams are written with the dot density of 1200 dpi by scanning by the 8 beams shown in FIG. 9, if the dot density is changed to 600 dpi, the combinations of the simultaneous light emitting beams include 111 and 112, 113 and 114, 115 and 116 and 117 and 118. Further, when the dot density is changed to 300 dpi, the combinations of the simultaneous light emitting beams include 111 to 114, and 115 to 118. Accordingly, one of the simultaneous light emitting beams is detected by the photo-detector 16, so that the detecting signal meeting the dot density can be obtained. Namely, as shown in FIGS. 11A and 11B, for instance, in the dot density 600 dpi, the beams 111, 113, 115 and 117 shown in FIG. 11A are allowed to emit the lights during when the beams pass the detector part 16A. In the dot density 300 dpi, the beams 111 and 115 shown in FIG. 11B are allowed to emit the lights so that the detecting signal meeting the dot density can be obtained. As the detecting signal 60 at this time, the signals shown respectively in FIGS. 12A and 12B can be obtained. When the beam is printed, a quantity of delay of other beams may be determined on the basis of the above-described measured results of the time by referring to the beams emitting the lights on the photo-detector relative to the combinations of the beams. Regarding FIG. 11B, in the converging beams 112 to 114 and 116 to 118, the time t2 shown in FIG. 12B is measured by the clock counter, and the beams 112 to 114 and 116 and 118 respectively set a time to a delayed time for each t2/4 relative to the detected beams 111 and 115, respectively, and accordingly, the beginning to write the beam can be determined. Since the pitch P1 is changed due to the influence of the deviation of a laser wavelength caused by temperature, the time t2 is measured so that the positional variation of the converging beams 111 to 118 can be respectively corrected.

The embodiments of the present invention are explained as mentioned above and various modifications can be made without changing a basic idea of the present invention and these modifications are included within the scope of the present invention.

For instance, in the above-described embodiment, when each dot density is formed, the photo-detector 16 functioning as detecting circuit is constructed so as to detect the first beam of a group of beams that emit the lights at the same time, however, there is especially no reason to limit the beam to be detected to the first beam and an arbitrary beam of the combined beams can be selected. In this case, the pitch of the selected beam in the sub-scanning direction is at least equal to the pitch of the dot density or a pitch integer times of the pitch of the dot density. The pitch is set to a pitch integer times of the pitch of the dot density, because when the space of P1 does not ensure the detecting width S1 or more of the detector part 16A of the photo-detector 16, a jump needs to be met. In this case, as the detecting signal 60, a pseudo signal needs to be generated by a signal from the selected beam.

Further, in the above-described embodiment, the case is described where the semiconductor laser elements are arranged one-dimensionally. However, when the semiconductor laser elements are arranged two-dimensionally like a laser array, the laser elements are arranged in the form of an array under a condition that the common multiple of the numbers of beams emitting lights at the same time for each dot density as described above is equal to the number of beams of a light source and the same number of elements of the array is arranged so that the beams are not overlapped in a sub-scanning direction. When a plurality of output beams from the array light source arranged with specific spaces are driven in parallel at the same time by the above-described optical system, the number of the beams of the light source, the space of the plurality of beams on a scanning surface, an adjacent relation between the plurality of scanning beams, a beam modulating time, a quantity of light of the beam and a method for detecting a position of the beginning to write the beam are set to optimum values, so that a dot density can be switched at high speed without providing a complicated structure.

What is claimed is:

1. An optical scanning apparatus, comprising:
a light source that emits a predetermined number of laser beams, the laser beams being arranged in a sub-scanning direction on a recording medium to form an imaginary single beam;
an optical unit that simultaneously scans the laser beams in parallel on the recording medium;
a first controller that changes a dot size of the laser beams in a main scanning direction; and
a second controller that changes the predetermined number based on the change of the dot size of the laser beams,
wherein the dot size is changed relative to a reference dot size L,
wherein the laser beams are arranged in the sub-scanning direction at an interval of 1/M times L, where M is an integer of 2 or more,
wherein the second controller switches the predetermined number between at least a first number N1 and a second number N2,
wherein the light source comprises beam generating elements each generating respective one of the laser beams, and
wherein a number of the beam generating elements is equal to a common multiple of the first number N1 and the second number N2.

2. The optical scanning apparatus according to claim 1, wherein the first controller comprises:
a generation unit that generates a plurality of clock signals having frequencies different from each other;
a selection unit that selects a modulation signal from the plurality of clock signals; and
a modulation unit that modulates the laser beams based on the modulation signal.

3. The optical scanning apparatus according to claim 1, wherein an intensity or a modulation pulse width of the laser beams is changed when the dot size and the predetermined number are changed.

4. The optical scanning apparatus according to claim 1, wherein intensities or modulation pulse widths of the laser beams are changed respectively when the dot size and the predetermined number are changed.

5. The optical scanning apparatus according to claim 1, further comprising:
a detector that selectively detects a sample laser beam from the laser beams to determine a start position of image-forming on the recording medium.

6. The optical scanning apparatus according to claim 5, wherein the sample laser beam is selected based on a dot density that is determined based on:
the dot size changed by the first controller; and
the predetermined number changed by the second controller.

7. The optical scanning apparatus according to claim 5, wherein an emitting timing for the sample laser beam is determined based on a detected result of the detector, and
wherein the emitting timing for a rest of the laser beams excluding the sample laser beam is determined by specifying a delay or an advance relative to the emitting timing for the sample laser beam.

8. The optical scanning apparatus according to claim 7, wherein the sample laser beam comprises a plurality of sample laser beams, and
wherein a time interval between the plurality of sample laser beams is measured to specify the delay or the advance relative to the emitting timing.

9. An optical scanning apparatus, comprising:
means for emitting a predetermined number of laser beams, the laser beams being arranged in a sub-scanning direction on a recording medium;
means for simultaneously scanning the laser beams in parallel on the recording medium;
means for changing a dot size of the laser beams in a main scanning direction; and
means for changing the predetermined number based on the change of the dot size of the laser beams,
wherein the dot size is changed relative to a reference dot size L,
wherein the laser beams are arranged in the sub-scanning direction at an interval of 1/M times L, where M is an integer of 2 or more,
wherein the means for changing the predetermined number switches the predetermined number between at least a first number N1 and a second number N2,
wherein the means for emitting comprises beam generating elements each generating respective one of the laser beams, and
wherein a number of the beam generating elements is equal to a common multiple of the first number N1 and the second number N2.

10. The optical scanning apparatus according to claim 2, wherein the first controller further comprises:
an image information forming part that receives an output signal of the selection unit,
wherein the image information forming part applies a signal comprising image information showing a print image to the modulation unit.

11. The optical scanning apparatus according to claim 10, wherein the light source further comprises a plurality of laser elements, and the first controller further comprises:
a beam synchronization circuit that determines a number of the laser beams that simultaneously emit light in the laser elements of the light source.

12. The optical scanning apparatus according to claim 11, wherein the modulation unit modulates the laser beams further based on a signal from the beam synchronization circuit.

13. The optical scanning apparatus according to claim 11, wherein the modulation unit modulates light beams outputted from the laser elements of the light source by a dot clock frequency of the selected modulation signal in accordance with the signal comprising the image information from the image information forming part.

14. The optical scanning apparatus according to claim 13, further comprising:
a photo-detector located in a vicinity of an end part of a scanning surface of the recording medium,
wherein, based on a detecting signal of the photo-detector, a scanning start time of each of the light beams is determined.

15. The optical scanning apparatus according to claim 14, wherein the modulation unit controls the laser elements of the light source synchronously with the detecting signal to modulate an intensity of the of the light beams respectively outputted from the laser elements in accordance with the image information from the image information forming part.

16. The optical scanning apparatus according to claim 1, further comprising:
a rotating polygon mirror that deflects the laser beams to a surface of the recording medium through the optical unit.

* * * * *